July 8, 1958 H. P. LUHN 2,842,754

MAGNETIC STORAGE DEVICE

Filed May 24, 1954 2 Sheets-Sheet 1

INVENTOR.
HANS P. LUHN
BY Joe L. Koerber
ATTORNEY

MAGNETIC STORAGE DEVICE

Filed May 24, 1954 2 Sheets-Sheet 2

INVENTOR.
HANS P. LUHN

BY Joe L. Koerber

ATTORNEY 2,842,754
Patented July 8, 1958

2,842,754

MAGNETIC STORAGE DEVICE

Hans P. Luhn, Armonk, N. Y., assignor to International Business Machines Corporation, New York, N. Y., a corporation of New York Application May 24, 1954, Serial No. 431,920

4 Claims. (Cl. 340—174)

This invention relates to an improved magnetic storage device, and more particularly to a device wherein the magnetic medium is in the nature of rods of limited length.

Prior art discloses devices of this general nature wherein data is stored magnetically on wires. The storing of data in such devices requires the selection of a particular wire, recording of data by passing the selected wire through a recording means, and replacing the wire in some type of storage magazine. To recall a bit of stored information, the particular wire must be located and passed through a reproducing head. It is obvious that a storage device comprising a great plurality of such wires, for example 10,000, would of necessity be very large and any mechanical means adapted to select and feed the wires past a recording or reproducing head would be very complex.

This improved device is designed to provide a simple, compact device of greatly increased storage capacity, without increasing the length of the storage medium. This result is achieved by providing means for recording on and reading from any one of a plurality of tracks extending longitudinally on any one of a plurality of magnetic rods.

It is an object of this invention to provide an improved device for storing data magnetically in predetermined locations, and means for reading out any of said data selectively.

Another object is to provide an improved device having a plurality of magnetic rods, each having a plurality of tracks extending longitudinally along its periphery, and having means associated therewith for reading data into and out of said tracks selectively.

Still another object is to provide a compact magnetic storage device of large capacity, from which data may be recalled quickly and selectively.

Other objects of the invention will be pointed out in the following description and claims and illustrated in the accompanying drawings, which disclose, by way of example, the principle of the invention and the best mode which has been contemplated of applying that principle.

Figures 1, 5:
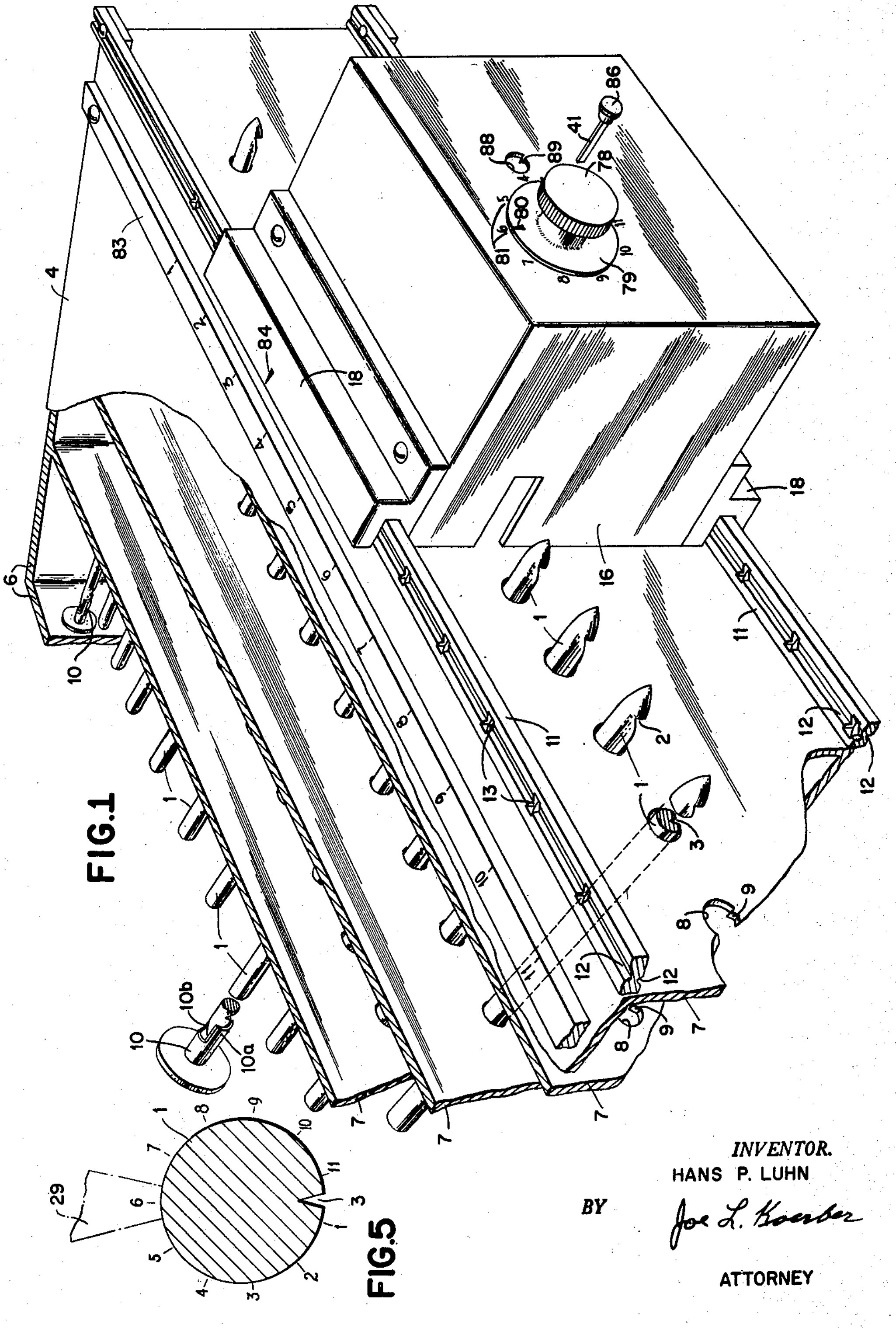
Fig. 1 is a perspective view of the improved magnetic storage device with a movable carriage containing a reading head and controls, and having parts broken away to facilitate illustration.
Fig. 5 is an enlarged sectional view of a storage rod and a fragment of the recording-reproducing head or transducer.

Briefly, this device comprises, as shown in Fig. 1, a magazine 4 for storing a plurality of rods 1, a carriage 16 mounted on rails 11 extending along one side of the magazine and movable to positions opposite the ends of selected rods, means for rotating a combination recording-reproducing head or transducer 29 (Fig. 5) to a position in alignment with the desired track on the selected rod, and means within the carriage for extracting the selected rod from the magazine and moving it past the transducer

*Rods and rod magazine*

Referring to Fig. 1, a plurality of rods 1 having notches 2 in each end (see Fig. 2) and bottom grooves 3 running the full length of the rods are mounted in a magazine 4 comprising wall portions 6 and partitions 7. The partitions 7, one of which forms the front wall of the magazine, have rows of axially aligned holes 8 for receiving the rods 1. Each hole 8 has a nib 9 for engaging the groove 3 and preventing rotation of the rod 1. The innermost end of each rod is yieldingly engaged by a spring steel member 10 affixed to the rear partition 7 and having two opposing fingers 10*a* and 10*b* which grip the rod as it is inserted into the magazine.

Mounted at the front of the magazine 4 are two rails 11, each containing an upper and a lower groove 12 and a plurality of notches 13 intersecting the grooves 12. A carriage, generally designated 16, is mounted on the rails 11. Refering to Figs. 2, the carriage 16 includes a housing 17 on which are mounted two brackets 18 containing channels 19. Opposite each other in holes bored in the walls of each channel 19 are two pairs of steel balls 22 which are urged against opposite sides of the rail 11 by springs 23 held in place by screws 24. The balls 22 ride in the grooves 12 when the carriage 16 is being shifted from one position to another. When the carriage 16 is properly positioned to receive any rod 1, the pairs of balls 22 are moved by the springs 23 into the intersecting notches 13 and act to retain the carriage 16 in that position.

Figures 2, 3, 4:
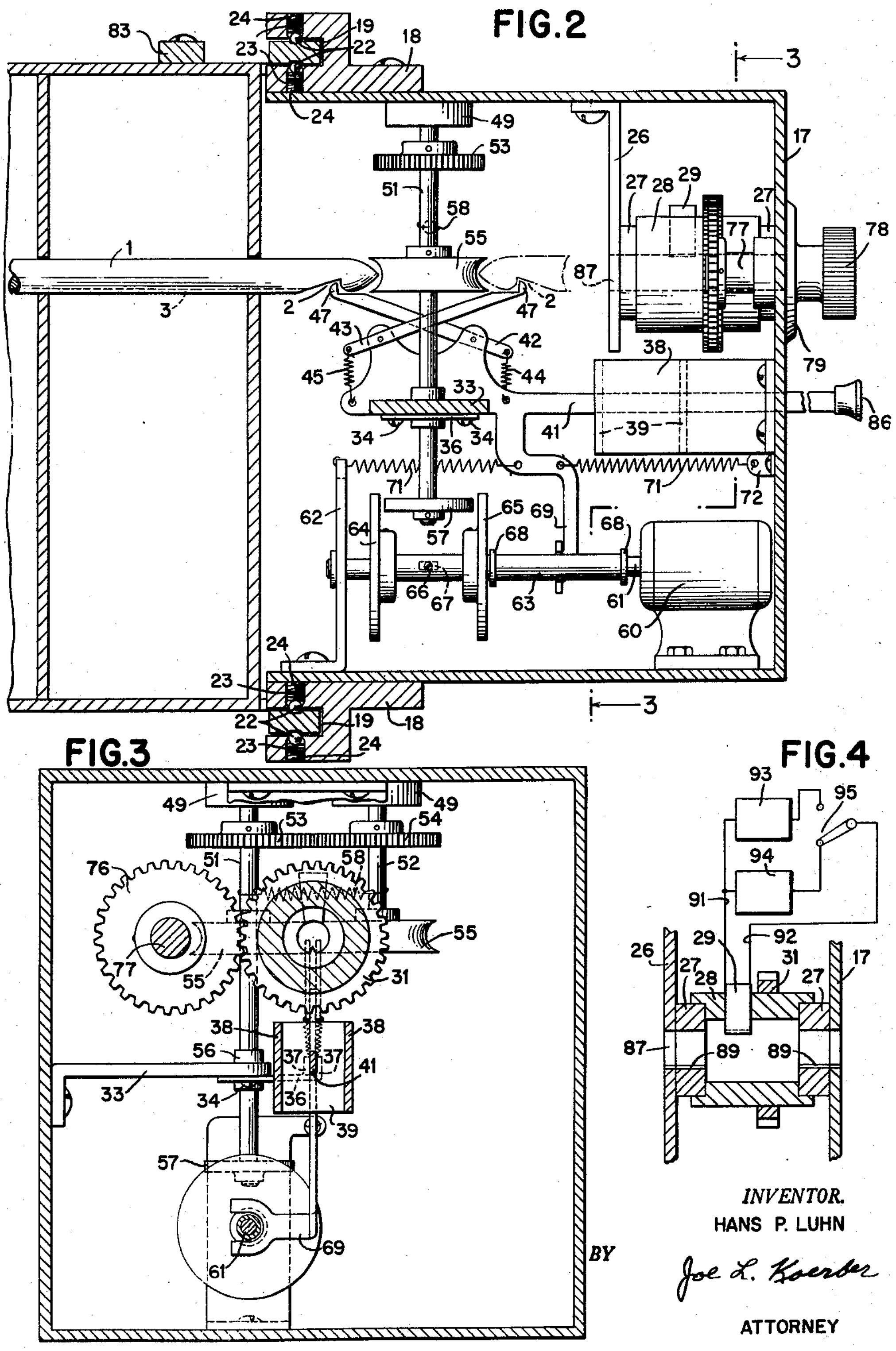
Fig. 2 is a view of the movable carriage with one side of the housing removed showing the recording-reproducing head or transducer and the rod extracting and feeding means.
Fig. 3 is a sectional view taken along the line 3—3 in Fig. 2.
Fig. 4 is a sectional view of the recording-reproducing head or transducer and diagrammatic illustration of associated recording and reproducing means.

Referring to Fig. 2, fixed to the inside of the top wall of the housing 17 is a bracket 26. Rotatably mounted on bearings 27 carried by the bracket 26 and the front wall of the housing 17 is a cylindrical member 28. Mounted on the member 28 is a transducer 29. Figs. 2 and 4, and an annular gear 31.

Attached to the side wall of the housing 17, Fig. 3, is a bracket 33, to which there is secured, as by screws 34, an extension 36 having a bifurcated end which is turned up to form two spaced lugs 37. Mounted on the front wall of the housing 17 is a bracket comprising two parallel members 38 connected by two cross members 39. Slidably mounted in aligned openings in the cross members 39 and the front housing wall is a member 41 which is supported at its left end, Fig. 2, between the upturned lugs of the extension 36. Pivotally mounted on the member 41 are two dogs 42 and 43 held by untensioned springs 44 and 45 in positions for engaging hooked ends 47 with the notches 2 in the rods 1. It will be noted that normally there is clearance between the notched rod 1 and the hooked dog 42 so that the carriage 16 may traverse the rails 11 freely to bring this dog into alignment with any one of the rods.

Referring to Figs. 2 and 3, supported at the top of the housing 17 by bearings 49 are two shafts 51 and 52. Mounted on the shafts 51 and 52 are two meshing gears 53 and 54 and two feed rolls 55 for feeding the rods 1 into and out of the magazine 4. The shaft 51 extends through the feed roll 55, through a bearing 56 mounted on the bracket 33 and has a clutch disc 57 attached to its lower end. The two feed rolls 55 are spring biased toward each other by a spring 58 to assure driving contact with the rods 1. It will be noted that an outward movement of the member 41 will cause a rod 1 to be drawn, by means of the dog 42, into engagement with the feed rolls 55.

Mounted in the housing 17, Fig. 2, is a motor 60 having a shaft 61 supported at its left end by a bracket 62, and this shaft rotates in a counterclockwise direction as viewed in Fig. 3. Loosely mounted on the shaft 61, Fig. 2, is a sleeve 63 having affixed thereto two circular discs 64 and 65. The sleeve 63 is pinned to the shaft 61 for rotation therewith by a screw 66 threaded into a hole in the sleeve 63 and extending into a slot 67 in the shaft 61. The sleeve 63 carries two collars 68 which are acted upon by the bifurcated end of an arm 69 forming a part of the member 41, when the member 41 is actuated. The disc 57 is positioned between the discs 64 and 65 with a small clearance such that a slight shifting of the sleeve 63 to the left, which is permissible due to the screw and slot connection with the shaft 61, moves the disc 65 into contact with the disc 57 thereby transmitting the rotation of the shaft 61 through the disc 57 and shaft 51 to one of the feed rolls 55 and through the gears 53 and 54 to the other feed roll 55. A slight shifting of the sleeve to the right brings the disc 64 into contact with the disc 57 for driving the latter in the opposite direction. It will be noted that a very small movement of the sleeve 63 will cause the disc 57 to be engaged by one of the clutch discs 64 or 65. Since a larger movement of the member 41 is required to move a rod into engagement with the feed rolls 55, the collars 68 on the sleeve 63 are spaced so that the arm 69 will be free to move while the rod 1 is being moved to the feed rolls and will still actuate the clutch at the proper time. The member 41 is held in its neutral position, as shown in Fig. 2, by opposing springs 71 affixed at one end to the arm 69 and at the other end to brackets 62 and 72 mounted on the housing 17.

Referring to Fig. 5, each rod 1 is designed to receive eleven tracks of magnetically recorded data angularly spaced on the periphery of the rod and running the length of the latter. The transducer 29 is rotated to the desired track as follows. Meshing with the gear 31, Fig. 3, is a gear 76 mounted on a shaft 77 and journalled in the front wall of the housing 17. The shaft 77 extends through the front wall of the housing 17, and has mounted thereon a track selector knob 78, Figs. 1 and 2, having a flange 79 with an index point 80. Marked on the front of the housing 17 adjacent the index flange 79 are numbers 81 running counterclockwise in ascending order from 1 through 11. Rotating the knob 78 in a counterclockwise direction results in a movement of the index 80 on the flange 79 past the numbers 81 in ascending order. Through the shaft 77 and the gears 76 and 31, the rotary motion is transmitted to the transducer support 28 and the transducer 29 is moved in a clockwise direction past the recording track positions shown in Fig. 5, to the selected track.

Mounted on the magazine, Fig. 1, is a scale 83 having numbers indicating the storage rod positions. Marked on the upper carriage support 18 is an index 84 to aid in positioning the carriage 16 in line with the desired rod 1.

With the carriage 16 positioned opposite the desired rod and with the head 29 rotated to the desired track, the selected rod may be fed into the feed rolls and past the transducer. The motor 60 is constantly running through suitable electrical connections, not shown. To extract the rod 1, the member 41 is pulled outwardly by means of a knob 86. The dog 42 engages the notch 2 and moves the rod 1 outwardly toward the feed rolls 55. As the rod 1 reaches the feed rolls 55, the bifurcated arm 69 engages the collar 68 and moves the disc 64 into engagement with disc 57. As the rod enters the feed rolls, the dog 42 is cammed counterclockwise tensioning the spring 44 and rides along the groove 3. The rod 1 is fed, as shown in Fig. 2 through an opening 87 in the bracket 26, the bearings 27 and the sleeve 28, and extends from the front of the carriage through an opening 88, Fig. 1. Extending into the openings 87 and 88 are nibs 89, Figs. 1 and 4, engaging the notch in the rod for holding the latter against rotation. As the trailing end of the rod 1 leaves the feed rolls 55, the dog 43, which has been riding along the groove 3 under tension of the spring 45, drops into the rear notch 2 and halts the rod 1.

To return the rod to the magazine, the knob 86 and member 41 are pushed inwardly causing the dog 43 to move the rod 1 into the feed rolls 55 while simultaneously moving the disc 65 to the left to contact the disc 57 and effect a driving of the rolls 55 in a direction to feed the rod 1 back into the magazine. On entering the magazine, the rod 1 is stopped by the spring device 10, Fig. 1, which prevents rebounding of the rod off the rear wall of the magazine 4, and stops the rod in a position providing the aforementioned clearance between the rod 1 and the dog 42.

Upon being released, the member 41 is returned to its neutral position, Fig. 2, by the springs 71. With the collars 68 no longer engaged by the arm 69, the sleeve 63 is free to slide and the driving action of the disc 64 or 65 moves the latter out of engagement with the disc 57 thereby stopping the feed rolls 55.

The carriage 16 may then be shifted for the selection of a second rod and the transducer 29 may be rotated for the selection of a particular track on the selected rod.

Extending from the transducer 29 in Fig. 4 are two leads 91 and 92 having connections to two blocks 93 and 94 which represent respectively means for pulsing the transducer 29 for recording and means responsive to the sensing of a recorded spot by the transducer 29 for reproducing the stored data. The recording means 93, for example, could be a manual key for recording data comprising a code of long and short pulses, or any one of the well known means of magnetically recording coded data. The reproducing means 94, for example, could be a single solenoid-operated stylus for recording long and short marks in response to the sensing of long and short magnetically recorded spots, or any one of the well known means of translating magnetically recorded data into another medium. A switch 95 is provided for selectively connecting the units 93 and 94 with the transducer 29.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A device for recording, storing, selecting and reproducing data comprising a plurality of magnetic rods of circular cross section and having a plurality of parallel recording tracks disposed side by side on the surface of said rods and extending longitudinally of the latter; a magazine for storing said rods; a unit comprising a motor, feed rolls, a rotatably mounted electromagnetic transducer, means for rotating said transducer selectively to positions adjacent said tracks, a clutch for connecting said motor in driving relation with said feed rolls, said clutch being reversible for driving said feed rolls in either direction selectively, a first member for moving a selected one of said rods into said rolls for feeding said rod past said transducer to a position beyond said rolls, a second member for moving a rod from said last position into said rolls for feeding said rod past said transducer in the opposite direction and a member movable for engaging said clutch for selectively rotating said feed rolls in either direction and for actuating said first and second members selectively according to the direction of rotation of said feed rolls; means slidably supporting said unit for movement selectively to positions adjacent the ends of said rods; and means including said transducer for selectively recording data on and reproducing data from a selected track of a selected rod as said rod is fed past said transducer.

2. A magnetic storage device comprising, in combination, a magazine, a plurality of elongated magnetizable members supported in said magazine for longitudinal movement, each of said members having a plurality of recording tracks spaced about its periphery and extending longitudinally thereof, a carriage slidably mounted on said magazine and movable to positions in registration selectively with any one of said members, a cylindrical member mounted on said carriage in a position to receive the elongated member in registration therewith, a magnetic head fixed to said cylindrical member in a position to sense data recorded in a track on said elongated member as it is moved through said cylindrical member, means for rotating said cylindrical member to position said head for sensing information in a selected track, means for moving said registered member through said cylindrical member, said moving means comprising feed rolls, a motor, means including clutch devices selectively operable for driving said feed rolls in one direction or another by said motor, notches in opposite ends of said elongated members, elements engageable with said notches for moving said registered member into said feed rolls, and a manually actuatable member movable in one direction for engaging one of said elements with a notch in said registered member to move the latter into said feed rolls and for operating one of said clutch devices to drive said feed rolls so as to feed said member in the same direction, said manually actuatable member being movable in the opposite direction for engaging the other of said elements with a notch for moving said registered member in the opposite direction into said feed rolls and for engaging the other of said clutch devices to drive said feed rolls in the opposite direction.

3. A magnetic storage device comprising, in combination, a magazine, a plurality of elongated magnetizable members of circular cross section having a notch therein and supported in said magazine for longitudinal movement, each of said members having a plurality of recording tracks spaced about its periphery and extending longitudinally thereof, a carriage slidably mounted on said magazine and movable to positions in registration selectively with any one of said members, means for moving longitudinally from said magazine the one of said members with which said carriage is registered, said moving means comprising a motor, a pair of feed rolls, a clutch operable for connecting said motor in driving relation with said feed rolls, an element engageable with said notch for moving said member into said feed rolls, and a manually actuatable member for operating said clutch and said notch engaging element, a magnetic head, means supporting said head on said carriage closely adjacent the path of said registered member as it is moved from said magazine, said supporting means being adjustable for moving said head selectively to any one of a plurality of positions about the path of said registered member, each of said last positions corresponding to one of said plurality of recording tracks on said registered member, means including said magnetic head adapted to read magnetically recorded data from said selected track of said registered member, as the latter is moved past said head.

4. A magnetic storage device comprising, in a combination, a magazine, a plurality of elongated magnetizable members of circular cross section having a notch therein and supported in said magazine for longitudinal movement, each of said members having a plurality of recording tracks spaced about its periphery and extending longitudinally thereof, a carriage slidably mounted on said magazine and movable to positions in registration selectively with any one of said members, means for moving longitudinally from said magazine the one of said members with which said carriage is registered, a magnetic transducer, transducer supporting means carried by said carriage and comprising a cylindrical rotatably mounted element having an axial bore for receiving the registered one of said magnetizable members, means mounting said transducer adjacent said axial bore, means operable for rotating said supporting means to selectively position said transducer and means including said transducer adapted to read and write data magnetically on the registered one of said members as the latter is moved therepast.

References Cited in the file of this patent

UNITED STATES PATENTS

| | | |
|---|---|---|
| 2,080,100 | Tauschek | May 11, 1937 |
| 2,416,445 | Jensen | Feb. 25, 1947 |
| 2,620,389 | Potter | Dec. 2, 1952 |
| 2,650,830 | Potter | Sept. 1, 1953 |